(12) United States Patent
Maier et al.

(10) Patent No.: US 11,719,874 B2
(45) Date of Patent: Aug. 8, 2023

(54) LIGHT GUIDE

(71) Applicant: ZKW Group GmbH, Wieselburg (AT)

(72) Inventors: Christian Maier, Oberndorf an der Melk (AT); Mahel Petr, Olomouc (CZ)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 17/994,683

(22) Filed: Nov. 28, 2022

(65) Prior Publication Data

US 2023/0176271 A1 Jun. 8, 2023

(30) Foreign Application Priority Data

Dec. 2, 2021 (EP) .................................... 21211908

(51) Int. Cl.
    *F21S 41/24*     (2018.01)
    *F21S 43/237*     (2018.01)
    *B60Q 1/04*     (2006.01)
    *F21V 8/00*     (2006.01)

(52) U.S. Cl.
CPC ............... *G02B 6/001* (2013.01); *B60Q 1/04* (2013.01); *F21S 41/24* (2018.01)

(58) Field of Classification Search
CPC ..................................................... F21S 43/237
See application file for complete search history.

(56) References Cited

U.S. PATENT DOCUMENTS

| | | |
|---|---|---|
| 5,718,497 A | 2/1998 | Yokoyama et al. |
| 10,260,704 B2 * | 4/2019 | Yamada ................ F21S 43/245 |
| 2006/0067084 A1 * | 3/2006 | Stefanov ............... F21S 43/237 |
| | | 362/556 |
| 2009/0185389 A1 * | 7/2009 | Tessnow .............. G02B 6/0038 |
| | | 362/516 |
| 2015/0029741 A1 | 1/2015 | Lee |

(Continued)

FOREIGN PATENT DOCUMENTS

| | | |
|---|---|---|
| JP | 2017041368 A | 2/2017 |
| JP | 2018046024 A | 3/2018 |

OTHER PUBLICATIONS

Search Report for European Patent Application No. 21211908.5 dated May 10, 2022 (7 pages).

*Primary Examiner* — Eric T Eide
(74) *Attorney, Agent, or Firm* — Eversheds Sutherland (US) LLP

(57) ABSTRACT

A light guide, including a light input surface, a longitudinal path, a lateral surface, wherein at least a portion of the lateral surface is configured as a light exit surface, wherein a first and a second light guide section includes a plurality of light redirection elements, which are configured to redirect light towards the light exit surface, wherein the light exit surface is a curved surface with a primary focal line, wherein each light redirection element has a certain incision-depth, which increases along the longitudinal path, wherein the light exit surface of the second light guide section has a protrusion, which has a secondary focal line, which is closer to the light exit surface than the primary focal line, wherein the light redirection elements of the first light guide section intersect the primary focal line, wherein the light redirection elements of the second light guide section intersect the primary focal line and the secondary focal line.

16 Claims, 3 Drawing Sheets

(56) References Cited

U.S. PATENT DOCUMENTS

| | | | |
|---|---|---|---|
| 2015/0292704 A1* | 10/2015 | Koshiro | F21S 43/237 |
| | | | 362/511 |
| 2017/0050557 A1 | 2/2017 | Yajima et al. | |
| 2017/0219761 A1* | 8/2017 | Fukui | F21S 43/245 |
| 2018/0031204 A1 | 2/2018 | Lamberterie et al. | |
| 2018/0194275 A1* | 7/2018 | Williams | B60Q 1/0041 |
| 2018/0372296 A1 | 12/2018 | Saito | |
| 2020/0041090 A1* | 2/2020 | Nakaya | F21S 43/245 |

\* cited by examiner

LIGHT GUIDE

CROSS-REFERENCE TO RELATED APPLICATIONS

This application claims priority to European Patent Application No. 21211908.5, filed Dec. 2, 2021, which is incorporated herein by reference.

FIELD OF THE INVENTION AND DESCRIPTION OF PRIOR ART

The invention relates to a light guide, which is configured to receive and emit light from a light source, wherein the light guide comprises:
- a light input surface, which is configured to receive light from a light source, wherein said light enters the light guide via the light input surface and propagates through at least a portion of the light guide along a longitudinal path, said longitudinal path being oriented essentially along a longitudinal extension of the light guide,
- a lateral surface, which extends from the light input surface along the longitudinal extension of the light guide, wherein the lateral surface defines an exterior shape of the light guide, wherein at least a portion of the lateral surface is configured as a light exit surface, through which light exists the light guide,
- a first light guide section and a second light guide section, wherein the first light guide section is closer to the light input surface than the second light guide section, wherein the first and second light guide section comprises a plurality of light redirection elements, which are arranged consecutively along the longitudinal extension of the light guide and opposite to the light exit surface, wherein the light redirection elements are configured to redirect at least a portion of the light, which propagates along the longitudinal path through the light guide, towards the light exit surface, wherein the redirected light exits the light guide through the light exit surface, wherein the light exit surface is a curved surface with a primary focal line, which is oriented essentially along the longitudinal extension of the light guide,
- wherein each light redirection element comprises a first face, which extends essentially radially towards a longitudinal axis of the light guide, and a second face, which is oriented at an angle to the first face, wherein the first face and second face form an essentially wedge-shaped recess, wherein the second face is configured to redirect incident light towards the light exit surface, wherein the impinging light is at least a portion of the light, which propagates along the longitudinal path through the light guide, wherein each light redirection element has a certain incision-depth, which is defined as the radial extent of the first face towards the longitudinal axis of the light guide, wherein the incision-depth increases along the longitudinal extension of the light guide, along the longitudinal path, wherein the incision-depth increases by such a rate, that the loss of luminous flux along the longitudinal path is being compensated, such that the light, which exits the light guide through the light exit surface, has an essentially equal luminous flux along the light exit surface.

The invention also relates to an illumination device for a vehicle headlamp, comprising a light guide and a light source that is configured to irradiate light into the light guide via its light input surface.

The invention also relates to a vehicle headlamp, comprising a light guide or an illumination device.

Light guides are well known in the prior art. Usually, light redirection elements, e.g. light output coupler such as output prisms, have a certain incision depth, which needs to increase along a longitudinal extension of the light guide. The increase of incision depth is necessary to provide light output over the entire length of the light guide. A larger incision depth results in a larger light redirection face, therefore, the reduced amount of light at the end of the light guide is compensated by a larger light redirection face.

A disadvantage of the increased incision depth is a resulting uneven light output across the light exit surface. In particular, a portion of the light exit surface, which corresponds to the deeper incision depths at the end/rear portion of the light guide shows spots or lines which are less bright compared to the portion of the light guide which has a smaller incision depth (i.e. the portion of the light exit surface which is relatively close to the light source).

It is therefore an object of the present invention to improve the light output of the light exit surface of a light guide.

This object is solved with a light guide according to claim 1. Preferred embodiments are described in depended claims.

SUMMARY OF THE INVENTION

According to a first aspect of the invention the light exit surface of the second light guide section has a protrusion, which has an essentially arc shaped cross section, wherein the protrusion is located essentially opposite to the light redirection elements, wherein the protrusion has a longitudinal extension, which is essentially parallel to the longitudinal axis of the light guide, wherein the protrusion has a secondary focal line, which is closer to the light exit surface than the primary focal line,
wherein the second faces of the light redirection elements of the first light guide section are arranged in such a way, that each second face intersects the primary focal line of the light exit surface,
wherein the second faces of the light redirection elements of the second light guide section are arranged in such a way, that each second face intersects the primary focal line of the light exit surface and the secondary focal line of the protrusion.

This has the advantage, that an even amount of light is being output along the entire light exit surface. Even amount means that the luminous flux across the entire light exit surface is essentially constant per area. This means that an observer sees no brighter or darker spots along the longitudinal extension of the light exit surface or the light guide respectively.

Preferably, light that exits the second light guide section is redirected by essentially the entire second face of the corresponding light redirection element.

Preferably, since the second faces of the light redirection elements of the second light guide section are arranged along the secondary focal line of the protrusion and the primary focal line of the light exit surface, a sharp and homogenous light distribution can be emitted by the light guide. This can result in a particularly homogeneous light impression for an observer of the light guide.

Preferably the primary and/or secondary focal line follows the form/curvature of the light guide.

Preferably, the secondary focal line is formed by or corresponds to the surface of the protrusion. The protrusion can essentially be configured to be a lens, for example a cylindrical lens, wherein the secondary focal line can be the focal line of the lens.

Preferably, since each second face intersects the primary focal line of the light exit surface and the secondary focal line of the protrusion, essentially the entire light that is incident on the second faces (i.e. the light in the area of the primary focal line and the light in the area of the secondary focal line) gets projected by the light exit surface and the protrusion of the light exit face respectively, which advantageously results in a sharp and homogenous light distribution emitted by the light guide. The longitudinal axis of the light guide can also be referred to as a central axis. In the context of this disclosure, cross section means a cut along a plane, which is oriented perpendicular to the longitudinal extension/path or longitudinal axis of the light guide.

Advantageously, the incision-depth of the first faces and the angle between the first faces and the second faces of the first light guide section are such, that the second faces of the first light guide section intersect the primary focal line, wherein the incision-depth of the first faces and the angle between the first faces and the second faces of the second light guide section are such, that the second faces of the second light guide section intersect the primary and secondary focal line. This had the advantage, that the light exit surface of the first light guide section and the light exit surface of the second light guide section emit a sharp, in focus light distribution.

Preferably, since the second faces of the second light guide section intersect the primary and the secondary focal line, essentially the entire light that is incident on the second faces gets projected by the light exit surface and the protrusion of the light exit surface.

Advantageously, the angle between the first and second face is between 1° and 90°, preferably between 15° and 75°, in particular between 25° and 65°. The angle can be constant along the longitudinal extension of the light guide. Alternatively, the angle can decrease along the longitudinal extension of the light guide, resulting in a larger possible area for the light to impinge on.

Advantageously, the opposite side of the angle is located on the lateral surface, wherein preferably the light redirection elements are reflective prisms. Reflective prims have the advantage of being cheap in production, since they can be created by carving wedge shaped recessed in the lateral surface of the light guide.

Advantageously, the primary and/or secondary focal line is essentially parallel to the longitudinal axis of the light guide. If the light guide has a curvature, the primary and/or secondary focal line can preferably follow that curvature.

Advantageously, the light guide is essentially of cylindrical shape, having a first cylinder radius, wherein the protrusion is essentially of cylindrical shape, having a second cylinder radius, wherein the first cylinder radius is greater than the second cylinder radius. Preferably, the first cylinder radius of the light guide is at least 1.5-times, preferably more than 2-times, in particular more than 3-times or more than 4-times greater than the second cylinder radius of the protrusion.

Advantageously, the protrusion is essentially of cylindrical shape, having a cylinder radius, wherein the cylinder radius gets larger, preferably continuously larger, along the longitudinal path. This has the advantage of a particularly homogenous light distribution being emitted from the light exit surface of the light guide, even at the far end of the light guide, i.e. the end portion of the light guide which is distal to the light source.

Advantageously, the protrusion is essentially of cylindrical shape, having a cylinder radius and a cylinder axis, wherein the cylinder radius is constant along the longitudinal path, wherein the perpendicular distance between the cylinder axis of the protrusion and a central axis of the light guide gets larger, preferably continuously larger, along the longitudinal path. This can be an alternative to the increasing cylinder radius, with the same advantage of a particularly homogenous light distribution being emitted from the light exit surface of the light guide, along the entire longitudinal extension.

Advantageously, the light guide is a transparent solid body, wherein the light redirection elements are recesses in the lateral surface of the solid body. This has the advantage of particularly low production costs for the light guide.

Advantageously, the protrusion extends across 10 to 25% of the light exit surface of the second light guide section. This has the advantage of a particularly homogenous light distribution being emitted from the entire light exit surface of the light guide, in particular, an essentially equal amount of light can be emitted from the proximal end and the distal end of the light guide, with no darker or brighter areas along the entire light exit surface.

Advantageously, the protrusion is located opposite to the light redirection elements of the second light guide section. Preferably, the protrusion is located diametrically to the light redirection elements of the second light guide section. This has the advantage that the light redirection elements redirect a larger amount of light directly onto the light emitting surface and the protrusion of the light emitting surface respectively.

Advantageously, the protrusion has a longitudinal extension, which es essentially parallel to the longitudinal extension of the light guide.

Advantageously, the protrusion has a cross section in the shape of a rotational paraboloid, wherein preferably the rotational paraboloid has a paraboloid radius, wherein the paraboloid radius gets larger, preferably continuously larger, along the longitudinal path.

In another aspect of the invention, an illumination device for a vehicle headlamp is provided, said illumination device comprising a light guide according to the invention.

In yet another aspect of the invention, a vehicle headlamp is provided, said vehicle headlamp comprising a light guide or an illumination device according to the invention.

BRIEF DESCRIPTION OF THE DRAWINGS

In the following, in order to further demonstrate the present invention, illustrative and non-restrictive embodiments are discussed, as shown in the drawings, wherein.

DETAILED DESCRIPTION OF EMBODIMENTS OF THE INVENTION

In the following figures identical reference signs refer to identical features unless expressly depicted otherwise. The reference signs are only for informational purpose and do not delimit the scope of protection.

For the sake of simplicity, elements which are not essential to the invention are not shown in the figures.

Figure 1:
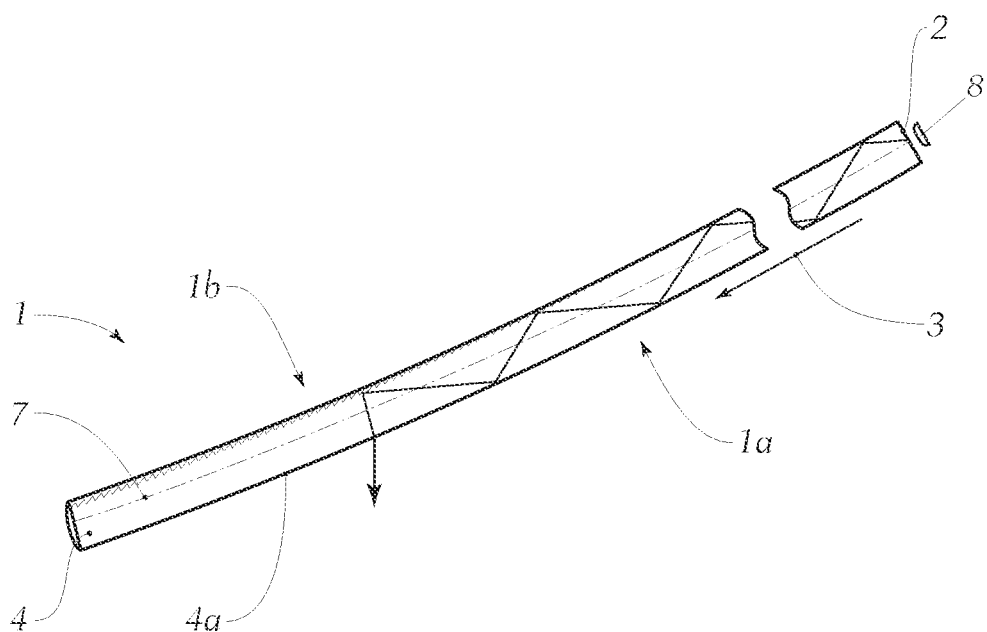
FIG. 1 shows a prior art light guide.

FIG. 1 shows a light guide 1 according to the prior art. The light guide 1 is configured to receive and emit light from a light source 8. The light guide 1 comprises a light input surface 2, which is configured to receive light from the light source 8. Said light enters the light guide 1 via the light input surface 2 and propagates through at least a portion of the light guide 1 along a longitudinal path 3. The longitudinal path 3 is oriented essentially along a longitudinal extension of the light guide 1. The light guide 1 has a lateral surface 4, which extends from the light input surface 2 along the longitudinal extension of the light guide 1. The lateral surface 4 defines an exterior shape of the light guide 1. At least a portion of the lateral surface 4 is configured as a light exit surface 4a, through which light exists the light guide 1.

The light guide 1 has a first light guide section 1a and a second light guide section 1b, wherein the first light guide section 1a is closer to the light input surface 2 than the second light guide section 1b. The first and second light guide section 1a, 1b comprises a plurality of light redirection elements 5, which are arranged consecutively along the longitudinal extension of the light guide 1 and opposite to the light exit surface 4a.

Figure 2:
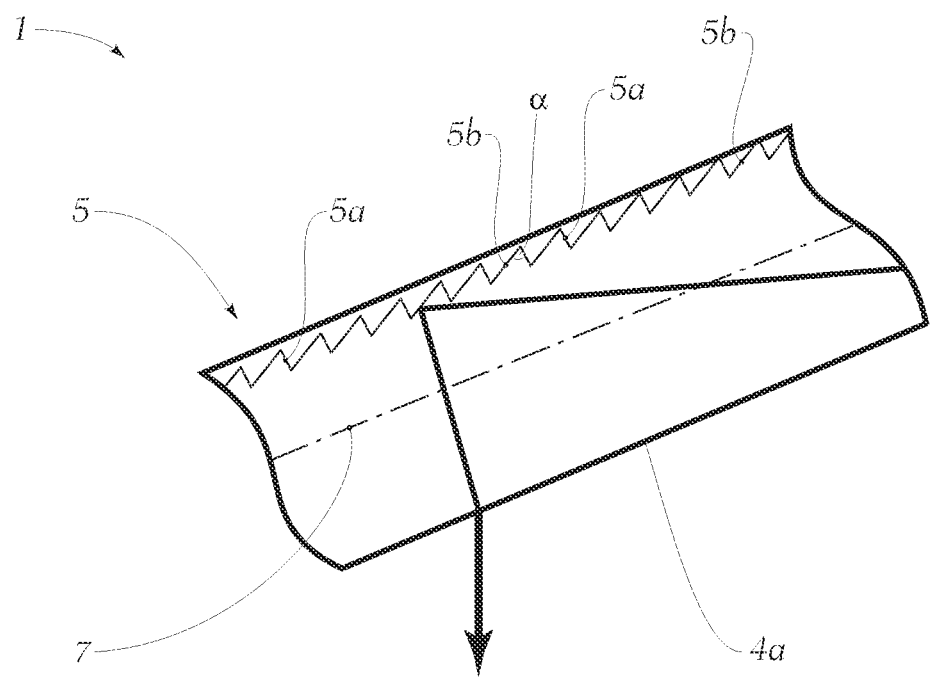
FIG. 2 shows a detailed view of the light guide according to FIG. 1.

FIG. 2 shows a detailed view of the light guide 1. The light redirection elements 5 are configured to redirect at least a portion of the light, which propagates along the longitudinal path 3 through the light guide 1, towards the light exit surface 4a. The redirected light exits the light guide 1 through the light exit surface 4a.

Each light redirection element 5 comprises a first face 5a, which extends essentially radially towards a longitudinal axis 7 of the light guide 1, and a second face 5b, which is oriented at an angle α to the first face 5a. The first face 5a and second face 5b form an essentially wedge-shaped recess. The second face 5b is configured to redirect incident light towards the light exit surface 4a, wherein the incident light is at least a portion of the light, which propagates along the longitudinal path 3 through the light guide 1.

The angle α between the first 5a and second face 5b can be between 1° and 90°, preferably between 15° and 75°, in particular between 25° and 65° The opposite side of the angle α is preferably located on the lateral surface 4. Preferably the light redirection elements 5 are reflective prisms.

Each light redirection element 5 has a certain incision-depth d (for more details see FIG. 4 and FIG. 5), which is defined as the radial extent of the first face 5a towards the longitudinal axis 7 of the light guide 1. The incision-depth d increases along the longitudinal extension of the light guide 1, along the longitudinal path 3. The incision-depth d increases by such a rate, that the loss of luminous flux along the longitudinal path 3 is being compensated, such that the light, which exits the light guide 1 through the light exit surface 4a, has an essentially equal luminous flux along the light exit surface 4a.

Figure 3:
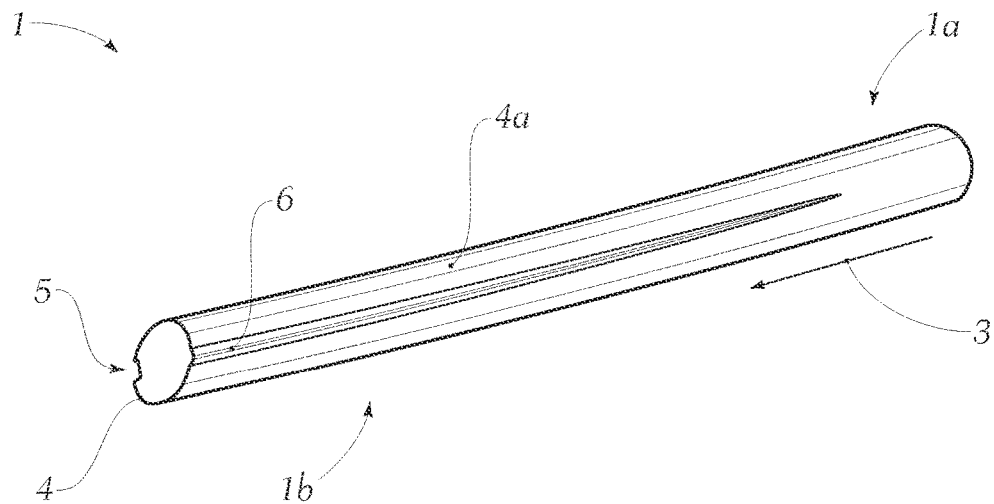
FIG. 3 shows a first embodiment of a light guide according to the invention.

FIG. 3 shows a first embodiment of a light guide according to the invention. In the shown embodiment, a light guide 1 is provided with a protrusion 6 on its light exit surface 4a, closer to the end portion of the light guide 1, i.e. the second light guide section 1b. To a person skilled in the art it should be clear that it is also possible to have two light guides 1, e.g. stacked vertically on top of each other The invention is not limited to one light guide only.

The light exit surface 4a of the light guide 1 is a curved surface with a primary focal line F1, which is oriented essentially along the longitudinal extension of the light guide 1.

Figures 4, 5:
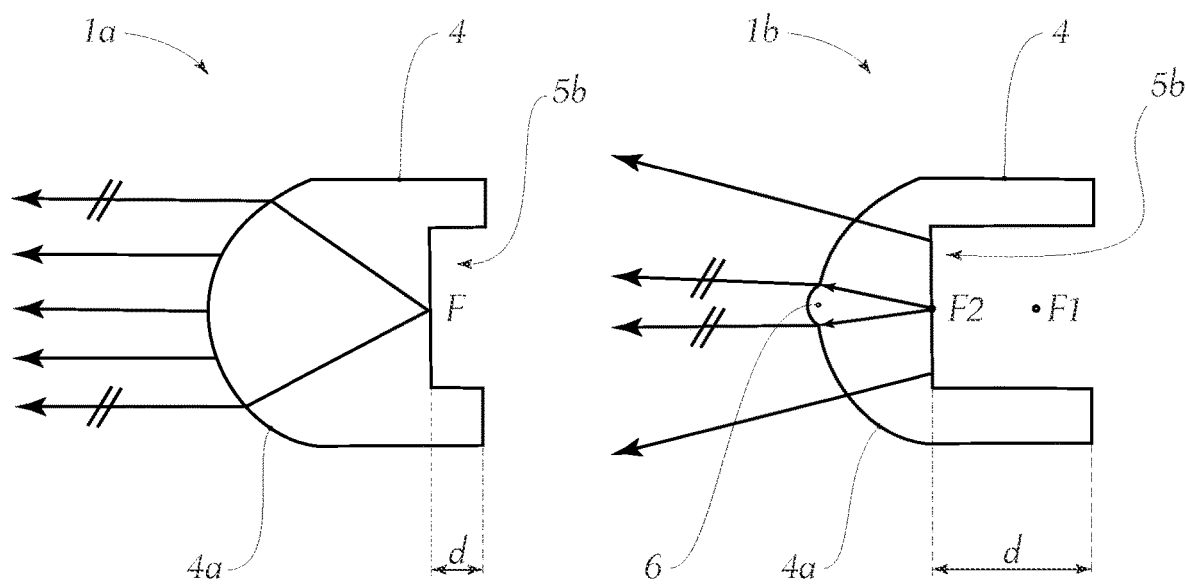
FIG. 4 shows a cross section of a first light guide section of a light guide according to the invention.
FIG. 5 shows a cross section of a second light guide section of a light guide according to the invention.

FIG. 4 shows a cross section of the first light guide section 1a of the light guide 1. It can be seen that the light redirection element 5 in the first light guide section 1a has a certain incision-depth d.

FIG. 5 shows a cross section of the second light guide section 1b of the light guide 1. It can be seen that the light redirection element 5 in the second light guide section 1b has a larger incision-depth d compared to the light redirection element 5 of the first light guide section 1a.

The light exit surface 4a of the second light guide section 1b has a protrusion 6, which has an essentially arc shaped cross section. The protrusion 6 is located essentially opposite to the light redirection elements 5. The protrusion 6 has a longitudinal extension, which is essentially parallel to the longitudinal axis 7 of the light guide 1, wherein the protrusion 6 has a secondary focal line F2, which is closer to the light exit surface 4a than the primary focal line F1 (see FIG. 4 and FIG. 5). The primary focal line F1 and/or secondary focal line F2 is essentially parallel to the longitudinal axis 7 of the light guide 1. The protrusion 6 can extend across 10 to 25% of the light exit surface 4a of the second light guide section 1b. The protrusion 6 can have a longitudinal extension, which es essentially parallel to the longitudinal extension of the light guide 1.

The second faces 5b of the light redirection elements 5 of the first light guide section 1a are arranged in such a way, that each second face 5a intersects the primary focal line F1 of the light exit surface 4a.

The second faces 5b of the light redirection elements 5 of the second light guide section 1b are arranged in such a way, that each second face 5b intersects the primary focal line F1 of the light exit surface 4a and the secondary focal line F2 of the protrusion 6.

As can be seen in FIG. 4, the incision-depth d of the first faces 5a (and/or the angle α between the first faces 5a and the second faces 5b) of the first light guide section 1a are such, that the second faces 5b of the first light guide section 1a intersect the primary focal line F1.

As can be seen in FIG. 5, the incision-depth d of the first faces 5a (and/or the angle α between the first faces 5a and the second faces 5b) of the second light guide section 1b are such, that the second faces 5b of the second light guide section 1b intersect the primary focal line F1 and the secondary focal line F2. As a result, the entire light incident on the first faces 5a of the second light guide section 1b can be homogenously projected by the light exit surface 4a. The protrusion 6 can be located opposite to the light redirection elements 5 of the second light guide section 1b.

In the shown embodiments, the light guide 1 is essentially of cylindrical shape, having a first cylinder radius. The protrusion 6 is essentially of cylindrical shape, having a second cylinder radius, wherein the first cylinder radius is greater than the second cylinder radius.

Figure 6:
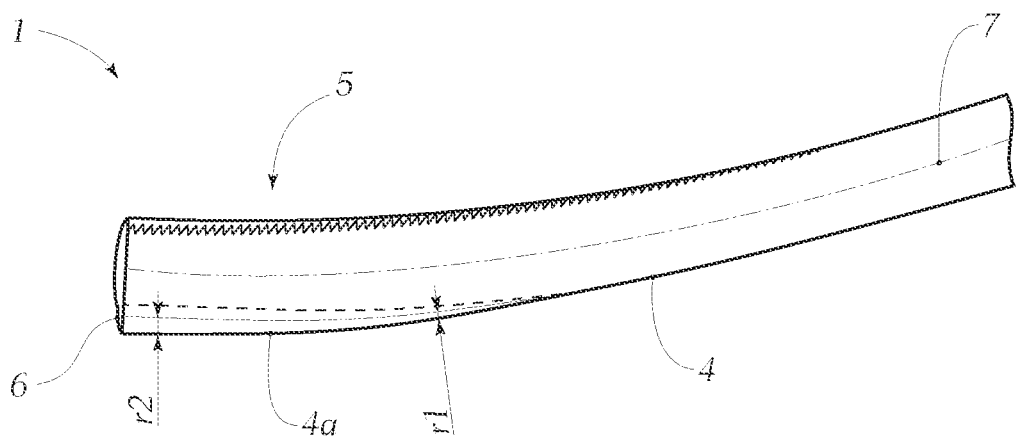
FIG. 6 shows a detailed view of the first embodiment of the light guide.

In the embodiment shown in FIG. 6 the protrusion 6 is essentially of cylindrical shape, having a cylinder radius, wherein the cylinder radius gets larger, preferably continuously larger, along the longitudinal path 3. This increase of the radius is shown in FIG. 6 since the radius r2 is greater than the radius r1.

Figure 7:
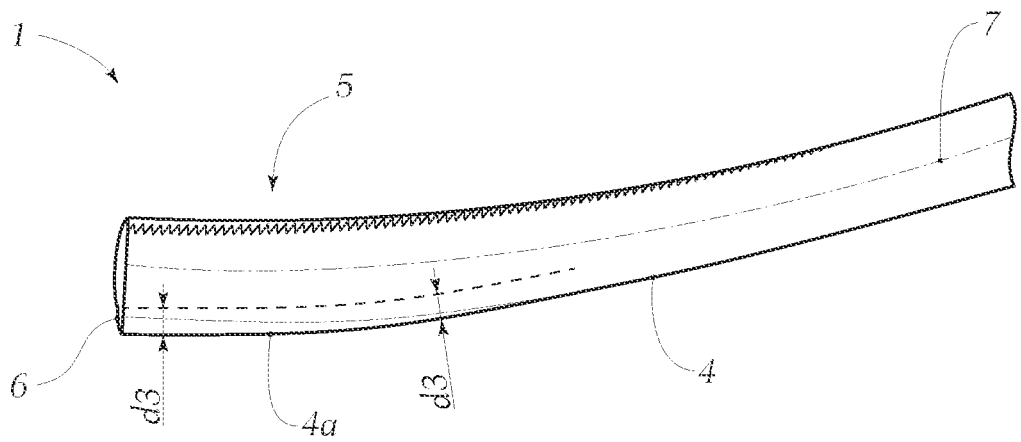
FIG. 7 shows a detailed view of a second embodiment of the light guide.
Figure 8:
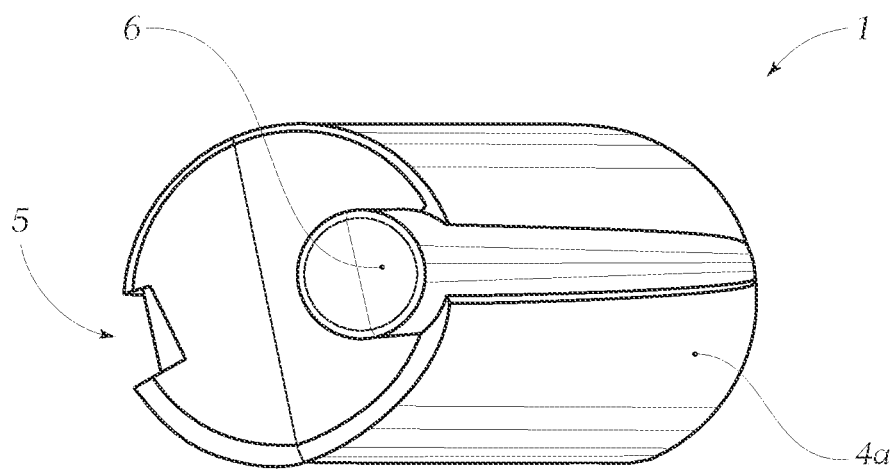
FIG. 8 shows another view of the light guide according to FIG. 7.

In the embodiment shown in FIG. 7 and FIG. 8 the protrusion 6 is essentially of cylindrical shape, having a cylinder radius and a cylinder axis, wherein the cylinder radius is constant along the longitudinal path 3. The perpendicular distance d3 (normal distance) between the cylinder axis of the protrusion 6 and a central axis of the light guide 1 gets larger, preferably continuously larger, along the longitudinal path 3.

Preferably, the light guide 1 is a transparent solid body, wherein the light redirection elements 5 are recesses in the lateral surface 4 of the solid body.

In an alternative embodiment, the protrusion 6 can have a cross section in the shape of a rotational paraboloid. Preferably the rotational paraboloid has a paraboloid radius, wherein the paraboloid radius gets larger, preferably continuously larger, along the longitudinal path 3.

Of course, the invention is not limited to the examples given in this specification, which merely show embodiments of the invention that can be carried out by a person skilled in the art in view of this disclosure.

The invention claimed is:

1. A light guide (1), which is configured to receive and emit light from a light source (8), wherein the light guide (1) comprises:
    a light input surface (2), which is configured to receive light from a light source (8), wherein said light enters the light guide (1) via the light input surface (2) and propagates through at least a portion of the light guide (1) along a longitudinal path (3), said longitudinal path (3) being oriented essentially along a longitudinal extension of the light guide (1);
    a lateral surface (4), which extends from the light input surface (2) along the longitudinal extension of the light guide (1), wherein the lateral surface (4) defines an exterior shape of the light guide (1), wherein at least a portion of the lateral surface (4) is configured as a light exit surface (4a), through which light exists the light guide (1);
    a first light guide section (1a) and a second light guide section (1b), wherein the first light guide section (1a) is closer to the light input surface (2) than the second light guide section (1b), wherein the first (1a) and second light guide section (1b) comprises a plurality of light redirection elements (5), which are arranged consecutively along the longitudinal extension of the light guide (1) and opposite to the light exit surface (4a), wherein the light redirection elements (5) are configured to redirect at least a portion of the light, which propagates along the longitudinal path (3) through the light guide (1), towards the light exit surface (4a), wherein the redirected light exits the light guide (1) through the light exit surface (4a), wherein the light exit surface (4a) is a curved surface with a primary focal line (F1), which is oriented essentially along the longitudinal extension of the light guide (1),
    wherein each light redirection element (5) comprises a first face (5a), which extends essentially radially towards a longitudinal axis (7) of the light guide (1), and a second face (5b), which is oriented at an angle ($\alpha$) to the first face (5a), wherein the first face (5a) and second face (5b) form an essentially wedge-shaped recess, wherein the second face (5b) is configured to redirect incident light towards the light exit surface (4a), wherein the incident light is at least a portion of the light, which propagates along the longitudinal path (3) through the light guide (1),
    wherein each light redirection element (5) has a certain incision-depth (d), which is defined as the radial extent of the first face (5a) towards the longitudinal axis (7) of the light guide (1), wherein the incision-depth (d) increases along the longitudinal extension of the light guide (1), along the longitudinal path (3), wherein the incision-depth (d) increases by such a rate, that the loss of luminous flux along the longitudinal path (3) is being compensated, such that the light, which exits the light guide (1) through the light exit surface (4a), has an essentially equal luminous flux along the light exit surface (4a),
    wherein the light exit surface (4a) of the second light guide section (1b) has a protrusion (6), which has an essentially arc shaped cross section, wherein the protrusion (6) is located essentially opposite to the light redirection elements (5), wherein the protrusion (6) has a longitudinal extension, which is essentially parallel to the longitudinal axis (7) of the light guide (1), wherein the protrusion (6) has a secondary focal line (F2), which is closer to the light exit surface (4a) than the primary focal line (F1),
    wherein the second faces (5b) of the light redirection elements (5) of the first light guide section (1a) are arranged in such a way, that each second face (5a) intersects the primary focal line (F1) of the light exit surface (4a), and
    wherein the second faces (5b) of the light redirection elements (5) of the second light guide section (1b) are arranged in such a way, that each second face (5b) intersects the primary focal line (F1) of the light exit surface (4a) and the secondary focal line (F2) of the protrusion (6).

2. The light guide (1) according to claim 1, wherein the incision-depth (d) of the first faces (5a) and the angle (a) between the first faces (5a) and the second faces (5b) of the first light guide section (1a) are such, that the second faces (5b) of the first light guide section (1a) intersect the primary focal line (F1), wherein the incision-depth (d) of the first faces (5a) and the angle (a) between the first faces (5a) and the second faces (5b) of the second light guide section (1b) are such, that the second faces (5b) of the second light guide section (1b) intersect the primary (F1) and the secondary focal line (F2).

3. The light guide (1) according to claim 1, wherein the angle (a) between the first (5a) and second face (5b) is between 1° and 90°, preferably between 15° and 75°, in particular between 25° and 65°.

4. The light guide (1) according to claim 1, wherein the opposite side of the angle (a) is located on the lateral surface (4), wherein preferably the light redirection elements (5) are reflective prisms.

5. The light guide (1) according to claim 1, wherein the primary (F1) and/or secondary focal line (F2) is essentially parallel to the longitudinal axis (7) of the light guide (1).

6. The light guide (1) according to claim 1, wherein the light guide (1) is essentially of cylindrical shape, having a first cylinder radius, wherein the protrusion (6) is essentially of cylindrical shape, having a second cylinder radius, wherein the first cylinder radius is greater than the second cylinder radius.

7. The light guide (1) according to claim 1, wherein the protrusion (6) is essentially of cylindrical shape, having a cylinder radius, wherein the cylinder radius gets larger, preferably continuously larger, along the longitudinal path (3).

8. The light guide (1) according to claim 1, wherein the protrusion (6) is essentially of cylindrical shape, having a cylinder radius and a cylinder axis, wherein the cylinder radius is constant along the longitudinal path (3), wherein the perpendicular distance between the cylinder axis of the protrusion (6) and a central axis of the light guide gets larger, preferably continuously larger, along the longitudinal path (3).

9. The light guide (1) according to claim 1, wherein the light guide (1) is a transparent solid body, wherein the light redirection elements (5) are recesses in the lateral surface (4) of the solid body.

10. The light guide (1) according to claim 1, wherein the protrusion (6) extends across 10 to 25% of the light exit surface (4*a*) of the second light guide section (1*b*).

11. The light guide (1) according to claim 1, wherein the protrusion (6) is located opposite to the light redirection elements (5) of the second light guide section (1*b*).

12. The light guide (1) according to claim 1, wherein the protrusion (6) has a longitudinal extension, which es essentially parallel to the longitudinal extension of the light guide (1).

13. The light guide (1) according to claim 1, wherein the protrusion (6) has a cross section in the shape of a rotational paraboloid, wherein preferably the rotational paraboloid has a paraboloid radius, wherein the paraboloid radius gets larger, preferably continuously larger, along the longitudinal path (3).

14. An illumination device for a vehicle headlamp, comprising:
  a light guide (1) according to claim 1; and
  a light source (8) that is configured to irradiate light into the light guide (1) via its light input surface (2).

15. A vehicle headlamp comprising a light guide (1) according to claim 1.

16. A vehicle headlamp comprising an illumination device according to claim 14.

\* \* \* \* \*